No. 607,518. Patented July 19, 1898.
A. MEYER.
WHEEL FOR VEHICLES.
(Application filed June 26, 1897.)
(No Model.)
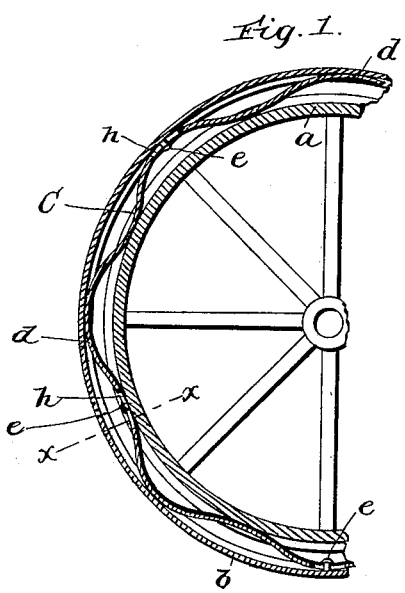
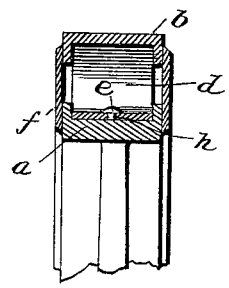
Witnesses:
Inventor
Alfred Meyer
By James J. Sheehy
Attorney
THE NORRIS PETERS CO., PHOTO-LITHO., WASHINGTON, D. C.

UNITED STATES PATENT OFFICE.

ALFRED MEYER, OF ZWICKAU, GERMANY.

WHEEL FOR VEHICLES.

SPECIFICATION forming part of Letters Patent No. 607,518, dated July 19, 1898.

Application filed June 26, 1897. Serial No. 642,517. (No model.)

*To all whom it may concern:*

Be it known that I, ALFRED MEYER, of Zwickau, in the Kingdom of Saxony, German Empire, have invented new and useful Improvements in Wheels for Vehicles, of which the following is a specification.

In the construction of wheels hitherto in general use with vehicles only that portion or half of the wheel which may at the time be below the hub participates in the support of the vehicle and its load. For this reason the wooden wheels of the large class of heavy wagons, gun-carriages, and the like have been given the required great power of resistance by ingenious disposition of naturally-grown curved wood.

According to this present invention the capacity for resistance of the wheel is to be increased by distributing, by means of a corrugated or undulated elastic cushion interposed between the rim and tire of the wheel and being alternately in contact with the rim and the tire, the pressure continuously upon the whole of the periphery of the wheel, thus admitting of the construction of the said class of wheels without careful selection of the wood being required.

In the annexed drawings, Figure 1 is a vertical section of a portion of a wheel constructed in accordance with my invention, and Fig. 2 is an enlarged detail section taken in the plane indicated by the line $x\,x$ of Fig. 1.

In the said drawings similar letters designate corresponding parts in both views.

A space $c$ is left between the rim $b$ of the wheel and tire $a$, in which, as shown in Fig. 1, a corrugated elastic ring $d$ is placed in such a manner that the successive corrugations or undulations are alternately brought into contact with the rim and the tire. The said corrugated or undulatory ring is preferably made of a strong steel band somewhat narrower in width than both rim and tire of the wheel. In order to maintain the said steel ring in the position intended for it, the edges of the tire, as well as those of the wheel-rim, are turned over, as shown in Fig. 2. For the same purpose the ring may be connected with the tire and the rim by means of rivets or screws $e$, which pass through the oblong slots $h$, provided in the ring, whereby a certain freedom of movement is given to the ring in the direction of the periphery of the wheel. This space $c$ is laterally closed by plates $f$, which are provided for the purpose of preventing the entrance of dust and mud.

When the vehicle is traveling, the pressure of the burden is transmitted through the hub by means of the spokes to the lower part of the rim and is by the latter communicated to ring $d$, which, possessing a high degree of elasticity and working loosely in its seat, transmits the said pressure to all its parts and distributes it through the contact-points to the whole of the rim and the whole of the tire— that is to say, to all the remaining spokes of the wheel.

By virtue of the described elastic ring the wheel is therefore enabled to support a heavier burden than would be the case if said elastic ring were not provided.

Slipping or sliding of the elastic ring on the rim or tire is obviated by making the said ring of such strength as to prevent any such movement. Slipping or sliding is further prevented by rivets or screws $e$, the said rivets or screws admitting only of a certain motion in the direction of the periphery of the wheel owing to the oblong slots, said motion being dependent upon the pressure of the superposed burden.

Having now described my invention, what I claim, and desire to secure by Letters Patent, is—

The herein-described vehicle-wheel consisting essentially of the rim $b$ having the outwardly-directed marginal flanges, the tire $a$ corresponding in width to and surrounding the rim and having the inwardly-directed marginal flanges, the annular dust-excluding plates $f$ connected to opposite sides of the rim and resting at opposite sides of the tire, the undulatory spring-metal ring interposed between the rim and the tire and impinging against the rim and tire alternately and having longitudinal slots in their portions contiguous to the rim and tire, and rivets $e$ extending through said slots and connecting the ring to the rim and tire, substantially as specified.

In testimony that I claim the foregoing as my invention I have signed my name in presence of two subscribing witnesses.

ALFRED MEYER.

Witnesses:
ROBERT HABERMEHL,
PAUL ARRAS.